United States Patent
Hsu et al.

(10) Patent No.: US 10,572,075 B2
(45) Date of Patent: Feb. 25, 2020

(54) SMART ELECTRONIC AUDIO BOOK WITH PAGE NUMBER DETECTION

(71) Applicants: Hung-Wang Hsu, Taoyuan (TW); Chun-Hsiang Yang, Taoyuan (TW)

(72) Inventors: Hung-Wang Hsu, Taoyuan (TW); Chun-Hsiang Yang, Taoyuan (TW)

(*) Notice: Subject to any disclaimer, the term of this patent is extended or adjusted under 35 U.S.C. 154(b) by 1013 days.

(21) Appl. No.: 15/049,364

(22) Filed: Feb. 22, 2016

(65) Prior Publication Data

US 2016/0274696 A1   Sep. 22, 2016

(30) Foreign Application Priority Data

Mar. 20, 2015  (TW) .............................. 104109060 A

(51) Int. Cl.
| | | |
|---|---|---|
| *G06F 3/0483* | (2013.01) | |
| *G06F 3/044* | (2006.01) | |
| *G06F 3/041* | (2006.01) | |
| *G06F 15/02* | (2006.01) | |

(52) U.S. Cl.
CPC ............ *G06F 3/044* (2013.01); *G06F 3/0416* (2013.01); *G06F 3/0483* (2013.01); *G06F 15/0291* (2013.01)

(58) Field of Classification Search
None
See application file for complete search history.

(56) References Cited

U.S. PATENT DOCUMENTS

| | | | | |
|---|---|---|---|---|
| 7,428,990 B1* | 9/2008 | Milford | ................. | G06K 7/081 235/435 |
| 2003/0116620 A1* | 6/2003 | Song | .................... | G06F 3/0224 235/375 |
| 2011/0102366 A1* | 5/2011 | Juan | ........................ | G06F 3/044 345/174 |

* cited by examiner

*Primary Examiner* — Bruk A Gebremichael
(74) *Attorney, Agent, or Firm* — Lin & Associates Intellectual Property, Inc.

(57) ABSTRACT

A smart electronic audio book with page number detection is disclosed, including at least a capacitive sensor, a touch control chip, a microprocessor, a player and a power supply unit, wherein a page number sensing strips is connected to the power supply unit to increase the amount of carried charge to facilitate the capacitive sensor to detect whether the page number sensing strip is within the detection range. A smart electronic audio book using a page number detection unit is also disclosed. The page number detection unit has a magnetic field detection element, and book pages are disposed with magnets. When the book page is turned, the magnetic flux change is detected by the magnetic field detection element to notify the microprocessor and the smart electronic audio book is able to detect page number with enhanced sensitivity and reliability.

5 Claims, 17 Drawing Sheets

SMART ELECTRONIC AUDIO BOOK WITH PAGE NUMBER DETECTION

CROSS-REFERENCE TO RELAYED APPLICATION

This application claims the priority of Taiwanese patent application No. 104109060, filed on Mar. 20, 2015, which is incorporated herewith by reference.

BACKGROUND OF THE INVENTION

1. Field of the Invention

The technical field generally relates to a smart electronic audio book, and in particular, relates to a smart electronic audio book with enhanced sensitivity and reliability in detecting page number.

2. The Prior Arts

Audio books provide convenience for enjoying reading for small children and vision-impaired readers.

Refer to Taiwanese Patent No. M491889, "Smart Electronic Audio Book", wherein the audio book includes a capacitive sensor, a touch control chip, a microprocessor and a player. The capacitive sensor detects the page number sensing strip and the touch medium; the touch control chip converts the capacitance change area of the capacitive sensor into a message of coordinate position of the page number sensing strip and a message of coordinate position of the touch medium; the microprocessor identifies the message of coordinate position of the page number sensing strip and the message of coordinate position of the touch medium to determine whether to transmit a page number output instruction and an audio output instruction; and the player plays the page number message corresponding to the page number output instruction and the audio message corresponding to the audio output instruction. As such, the present invention can detect and play the current page number of the book as well as detect the touch position of the touch medium. When the touch medium, such as, hand, moves to graphs or texts on the page, the player plays the audio or sound effects corresponding to the graphs or texts on the page.

However, although the conventional smart electronic audio books are able to effectively detect the touch medium, such as hand, the capacitive sensor cannot always detect the page number sensing strip when the capacitive sensor is used. It is because the amount of charges carried by the page number sensing strip is close to the ambient noise signal, which causes the capacitive sensor to fail to effectively distinguish the page number sensing strip from the noise signal. Therefore, the page number sensing strip must be devised to carry an amount of charges close to the finger touch so that the capacitive sensor can detect the change in real time to ensure the sensitivity and reliability of the page number sensing strip. Alternatively, a change in magnetic flux can also be detected to improve the sensitivity and reliability of the page number sensing strip of the smart electronic audio book.

SUMMARY OF THE INVENTION

The primary objective of the present invention is to provide a smart electronic audio book with enhanced sensitivity and reliability in detecting page number, which is able to detect and play the current page number of the audio book. The audio book includes a capacitive sensor, disposed in the audio book; a plurality of pages and a plurality of page number sensing strips, with each page being disposed with a page number sensing strip. Each of the plurality of page number sensing strips has a different size or has the same size but is disposed at a different position in its corresponding page. When one of the plurality of page number sensing strips is within a range of the capacitive sensor, a sensed capacitance of the capacitive sensor changes. A touch control chip, electrically connected to the capacitive sensor for detecting a position of the sensed capacitance change converts the position of the sensed capacitance change into a page number sensing strip coordination, and transmits the page number sensing strip coordination. A microprocessor, having a database of the page number sensing strip coordination, identifies whether the page number sensing strip coordination transmitted from the touch control chip matches a data entry in the built-in database of the page number sensing strip coordination so as to determine whether to transmit a page number output instruction corresponding to the page number sensing strip coordination. A player, having a built-in audio database, receives the page number output instruction and plays a page number message corresponding to the page number output instruction.

Another objective of the present invention is to provide a smart electronic audio book with enhanced sensitivity and reliability in detecting page number, able to detect a touch position of a hand or touch medium in addition to detecting and playing the current page number of an audio book. When the hand or the touch medium moves to a graph or a text in a page, a speech or audio effect corresponding to the graph or the text in the page is played.

To achieve the aforementioned objects, the technical feature of the present invention includes a capacitive sensor, disposed in the audio book; a plurality of pages and a plurality of page number sensing strips, with each page being disposed with a page number sensing strip. Each of the plurality of page number sensing strips has a different size or has the same size but is disposed at a different position in its corresponding page. When one of the plurality of page number sensing strips is within a range of the capacitive sensor, a sensed capacitance of the capacitive sensor changes. When at least a touch medium enters within the range of the capacitive sensor, a sensed capacitance of the capacitive sensor position corresponding to the at least a touch medium changes. A touch control chip, electrically connected to the capacitive sensor for detecting a position of the sensed capacitance change of the capacitive sensor, converts the position of the sensed capacitance change of the capacitive sensor into a page number sensing strip coordination, and transmits the page number sensing strip coordination and a touch medium coordination. A microprocessor, having a database of the page number sensing strip coordination and a database of the touch medium coordination, identifies whether the page number sensing strip coordination transmitted from the touch control chip matches a data entry in the built-in database of the page number sensing strip coordination so as to determine whether to transmit a page number output instruction corresponding to the page number sensing strip coordination. The microprocessor also identifies whether the touch medium coordination transmitted from the touch control chip matches a data entry in the built-in database of the touch medium coordination so as to determine whether to transmit a speech output instruction corresponding to the touch medium coordination. A player, having a built-in audio database, receives the page number output instruction and the speech output instruction, and plays a page number message corresponding to the page number output instruction, and a speech message corresponding to the speech output instruction.

The present invention further includes a power supply unit, electrically connected to one, the plurality of or all of the page number sensing strips. The power supply unit is disposed inside or outside of the smart audio book with enhanced sensitivity and reliability in detecting page number, or inside or outside of the physical audio book.

Another objective of the present invention is to provide a smart electronic audio book with enhanced sensitivity and reliability in detecting page number, including a page number detection unit, disposed in a physical audio book and having a magnetic field detection element with an effective magnetic field detection range. The physical audio book has a plurality of pages, with each page disposed with a magnet. When the page is not turned, the magnet is located within the effective magnetic field detection range of the magnetic field detection element, and the magnetic field detection element generates and outputs a page number detection signal according to whether the magnet is located within the effective magnetic field detection range of the magnetic field detection element. A microprocessor, electrically connected to the page number detection unit to receive the page number detection message, determines a page number output instruction corresponding to the page number detection message according to a conduction state of the received page number detection message and outputs the page number output instruction. A player receives the page number output instruction and plays a page number message corresponding to the page number output instruction.

Because the flux of a magnet changes dramatically when the magnet gets suddenly close to or away from the magnetic field detection element, the magnetic field detection element, such as, a hall effect sensor switch, can immediately switch to a conductive state or a cut-off state according to the flux change. Therefore, the smart electronic audio book can detect the page number message of the current page in a more timely and effective manner to improve the sensitivity and reliability of the page number detection.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein:

FIG. 3b shows a schematic view of a circuit block diagram corresponding to the embodiment of FIG. 3a;

FIG. 4b shows a schematic view of a circuit block diagram corresponding to the embodiment of FIG. 4a;

FIG. 10b shows a schematic view of the circuit block diagram of detecting the cover of the physical book in accordance with FIG. 10a; and FIG. 10c shows a schematic view of the circuit block diagram of detecting the first page of the physical book in accordance with FIG. 10a.

DETAILED DESCRIPTION OF THE PREFERRED EMBODIMENT

Figure 1:
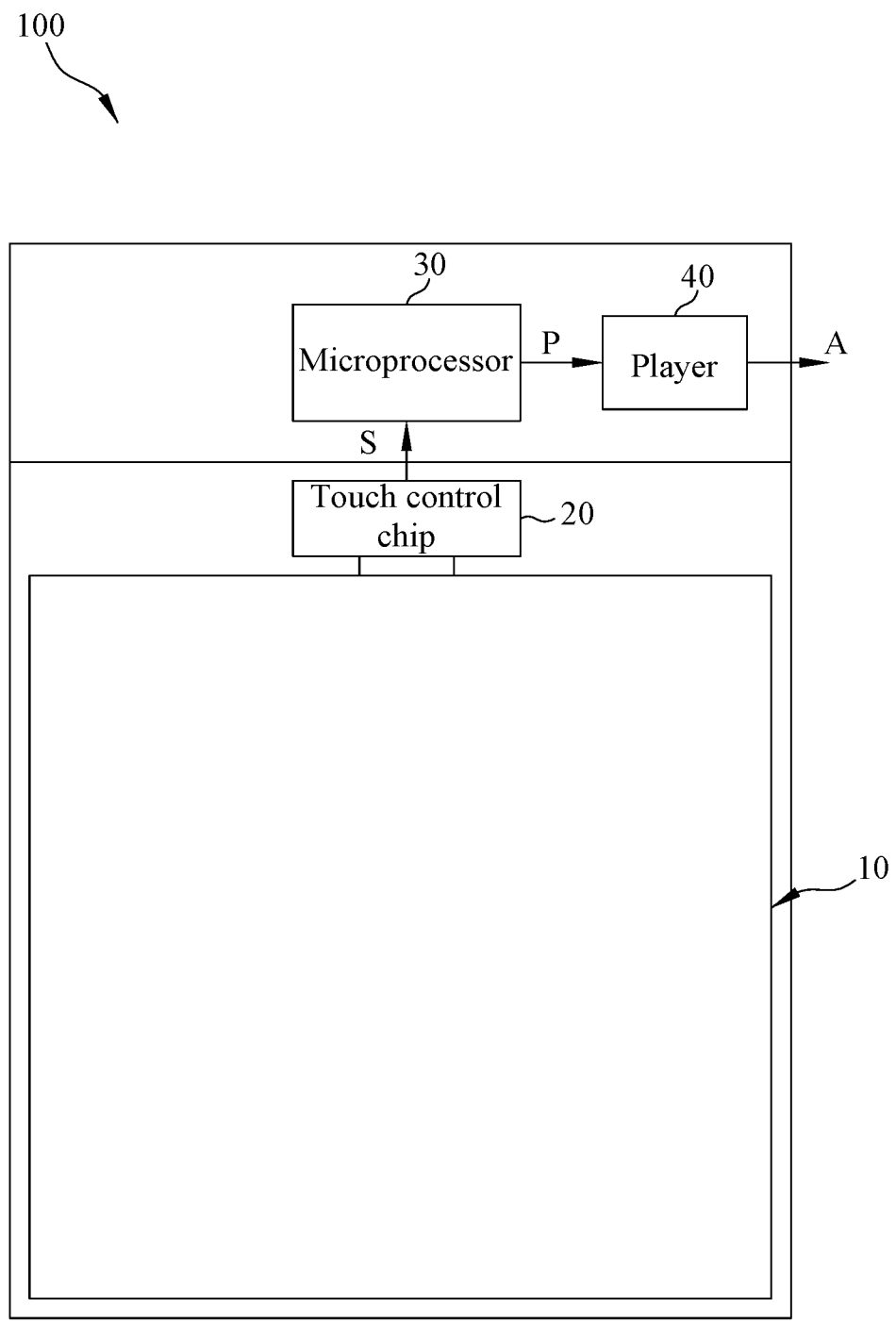
FIG. 1 shows a schematic view of a smart electronic audio book with enhanced sensitivity and reliability in detecting page number in accordance with an exemplary embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, FIG. 1 shows a schematic view of a smart electronic audio book with enhanced sensitivity and reliability in detecting page number in accordance with an exemplary embodiment. A smart electronic audio book with enhanced sensitivity and reliability in detecting page number of the present invention is able to detect and play in real time the current page number of the audio book. As shown in FIG. 1, a smart electronic audio book 100 with enhanced sensitivity and reliability in detecting page number includes a capacitive sensor 10, a touch control chip 20, a microprocessor 30, and a player 40.

As shown in FIG. 1, the touch control chip 20 is electrically connected to the capacitive sensor 10 to detect and identify in real time the area where the sensed capacitance changes in the capacitive sensor 10. Then, the touch control chip 20 computes to convert the area where the sensed capacitance changes in the capacitive sensor 10 into a page number sensor strip coordination message S, and transmits the message S.

Accordingly, the capacitive sensor 10 can be an indium tin oxide (ITO) film sensor, projective capacitive touch sensor, flexible ITO film sensor, flexible projective capacitive touch sensor, or other sensors with capability of air touch sensing.

The microprocessor 30 includes a built-in page number sensing strip coordination database. The microprocessor 30 identifies whether the page number sensing strip coordination message S transmitted from the touch control chip 20 matches a data entry in the built-in database of the page number sensing strip coordination so as to determine whether to transmit a page number output instruction P corresponding to the page number sensing strip coordination message S.

The player 40 also includes a built-in audio database. The player receives the page number output instruction P and plays a page number message A or an audiovisual/light effect corresponding to the page number output instruction, wherein the page number message A can be either a speech or a sound effect. When the audiovisual/light effect is required, the present invention further includes a lighting device (not shown in FIG. 1), and the lighting device is electrically connected to the microprocessor 30 to receive a control instruction from the microprocessor 30.

Figure 2A:
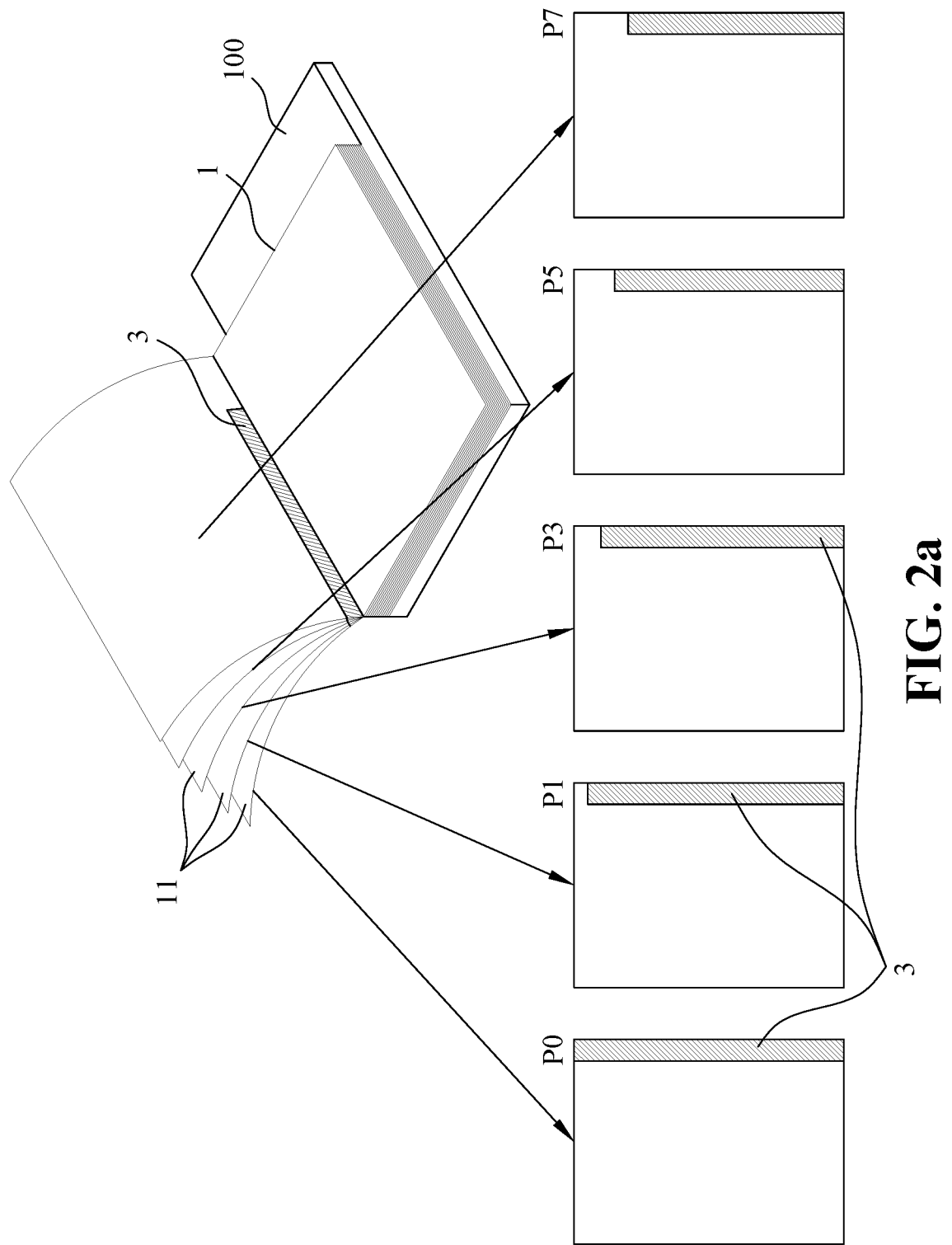
FIG. 2a shows a schematic view of a physical audio book disposed with page number sensing strips in accordance with an embodiment.
Figure 2B:
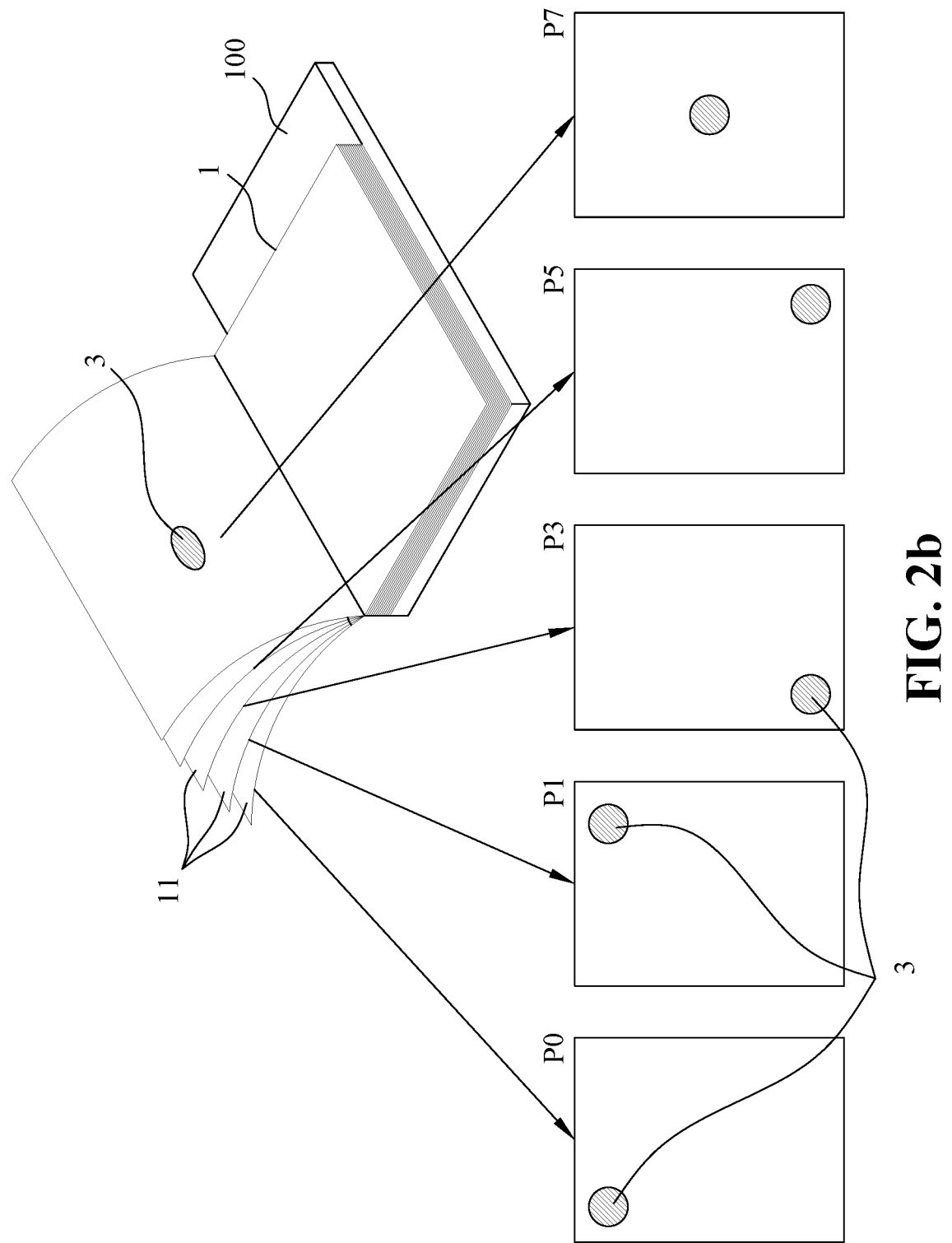
FIG. 2b shows another schematic view of a physical audio book disposed with page number sensing strips in accordance with another embodiment.

Refer to FIG. 2a and FIG. 2b. FIG. 2a shows a schematic view of a physical audio book disposed with page number sensing strips in accordance with an embodiment, and FIG. 2b shows another schematic view of a physical audio book disposed with page number sensing strips in accordance with another embodiment. As shown in FIG. 2a, the capacitive sensor 10 is disposed in a physical audio book 1, and the physical audio book 1 includes a plurality of pages 11 and a plurality of page number sensing strips 3. Each page 11 is disposed with a page number sensing strip 3. Each of the plurality of page number sensing strips 3 is of a different size or is of the same size but is disposed at different position in its corresponding page 11. When one of the plurality of page number sensing strips 3 is within a range of the capacitive sensor 10, a sensed capacitance of the capacitive sensor 10 changes.

As shown in FIG. 2a, the page number sensing strip 3 of the first page P1 covers an area slightly smaller than the page number sensing strip 3 of the cover page P0, the page number sensing strip 3 of the third page P3 covers an area slightly smaller than the page number sensing strip 3 of the first page P1, and so on. Also, the page number sensing strip 3 of the first page P1 can fully cover the page number sensing strip 3 of the third page P3, the page number sensing strip 3 of the third page P3 can fully cover the page number sensing strip 3 of the fifth page P5, and so on. It should be noted that the exemplar using the page number sensing strips 3 of different sizes disposed in different pages 11 is merely for illustrative purpose, instead of restrictive. The actual number, disposition positions, and disposition manners of the page number sensing strips 3 can vary in accordance with applications.

Alternatively, as shown in FIG. 2b, the disposition position of each page number sensing strips 3 is different from the other page number sensing strips 3, wherein the physical audio book 1 can be of the form of a book, a calendar, or other forms suitable for publication.

As shown in FIG. 2a, the page number sensing strip 3 can be disposed directly on the surface of a page 11, preferably close to the binding side of physical audio book 1; alternatively, the page number sensing strip 3 can be disposed between two sheets of a page if the page 11 is made of two sheets of paper. It should be noted that the exemplar disposing the page number sensing strip 3 is merely for illustrative purpose, instead of restrictive.

In a preferred embodiment, the present invention further includes a power supply unit (not shown), which is electrically connected to one, a plurality of, or all the page number sensing strips 3. The power supply unit can be disposed inside or outside of the smart audio book 100 with enhanced sensitivity and reliability in detecting page number, or inside or outside of the physical audio book 1. The power supply unit is a direct current (DC) source, such as a battery.

The disposition of the power supply unit can increase the charge amount carried by the page number sensing strip 3, that is, to make the charge amount carried by the page number sensing strip 3 close to the charge amount carried by a finger. Therefore, when the page number sensing strip 3 gets close to or away from the capacitive sensor 10, the sensed capacitance of the capacitive sensor 10 corresponding to the area of the page number sensing strip 3 changes in real time so as to effectively generate the page number sensing strip coordination message S to ensure the reliability of the page number detection, leading to effective improvement on the sensitivity and reliability of the page number detection of the smart electronic audio book.

Figure 3A:
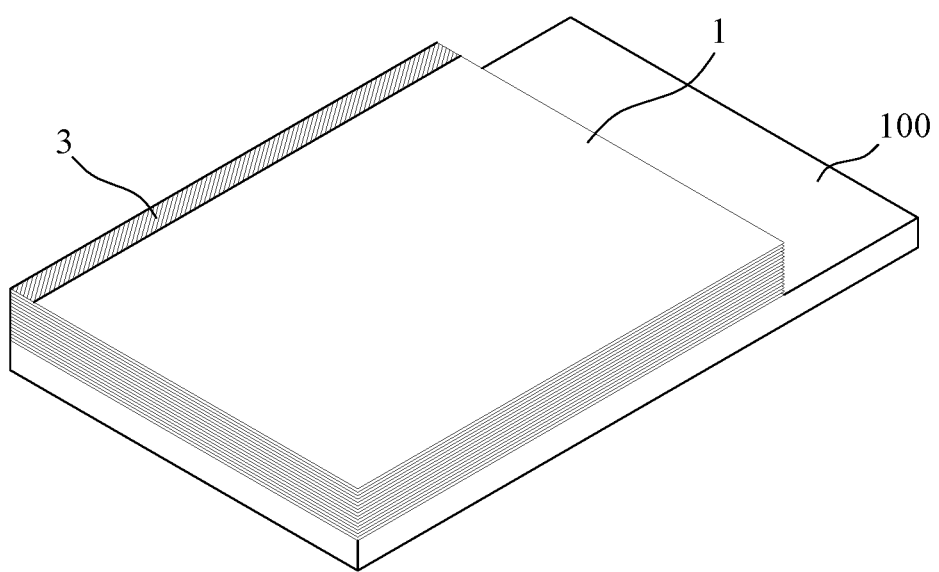
FIG. 3a shows a schematic view of the cover of a physical smart electronic audio book with enhanced sensitivity and reliability in detecting page number in accordance with an embodiment.
Figure 3B:
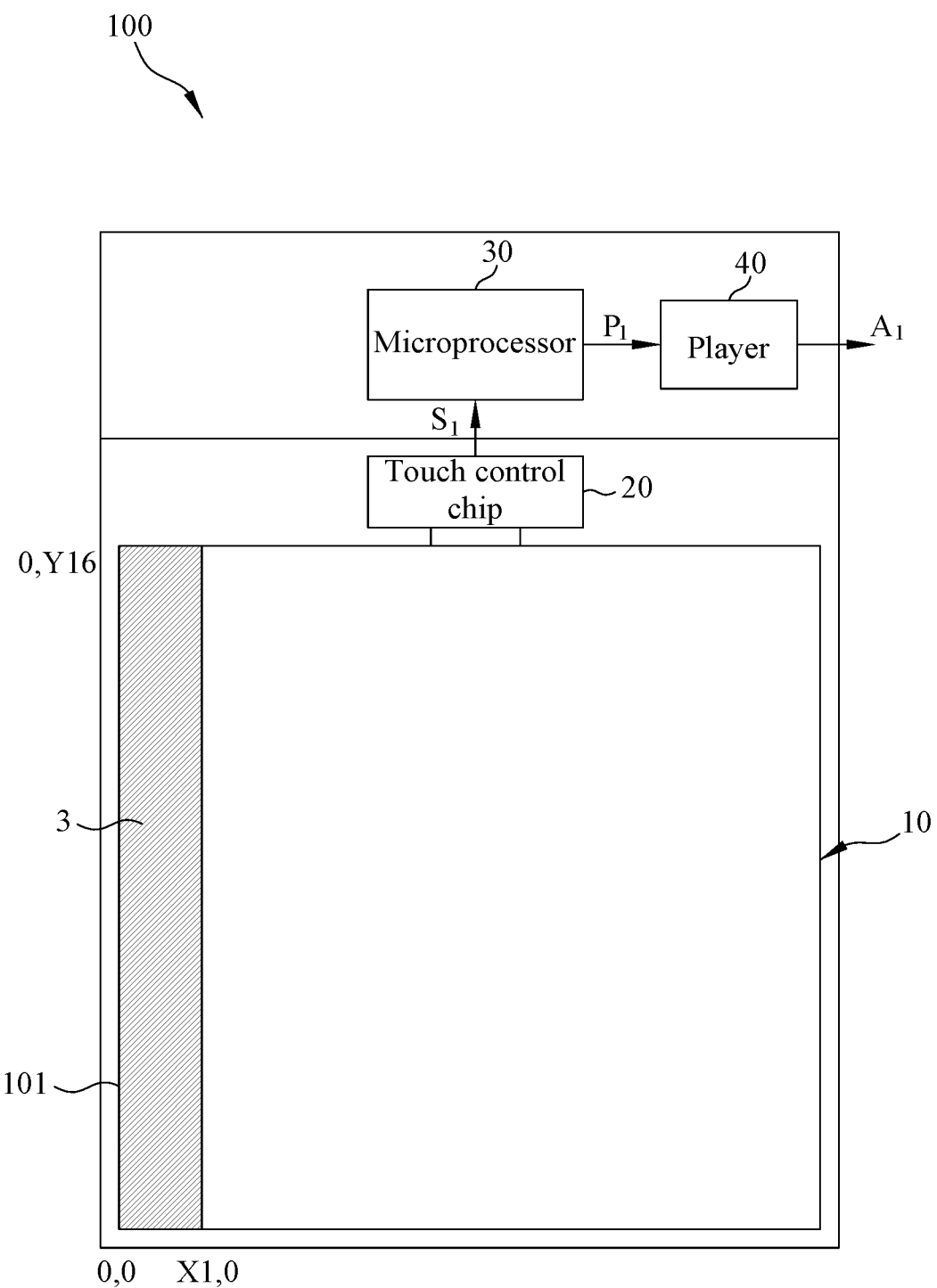

Refer to FIG. 3a and FIG. 3b. FIG. 3a shows a schematic view of the cover of a physical smart electronic audio book with enhanced sensitivity and reliability in detecting page number in accordance with an embodiment; and FIG. 3b shows a schematic view of a circuit block diagram corresponding to the embodiment of FIG. 3a. To explain the present invention, the area of the capacitive sensor 10 corresponding to the page number sensing strip 3 is defined as a page number sensing area 101.

Refer to FIG. 3b. When the physical audio book 1 is closed, the page number sensing area 101 is fully covered. Therefore, the sensed capacitance of the page number sensing area 101 of the capacitive sensor 10 will change.

Refer to FIG. 3b. When the sensed capacitances of the page number sensing areas 101 of the capacitive sensor 10 change at the same time, the touch control chip 20 detects the area with changing sensed capacitance of the page number sensing area 101. The touch control chip 20 computes to generate a page number sensing strip coordination message $S_1$ for the microprocessor to identify, as shown in FIG. 3b, and transmits the message. For the convenience of explanation, the page number sensing strip coordination message $S_1$ is (0-X1, 0-Y16) when the physical audio book 1 is closed.

An entry for the page number sensing strip sensing coordination message (0-X1, 0-Y16) and a page number output instruction $P_1$ corresponding to the page number sensing strip sensing coordination message (0-X1, 0-Y16) are entered into the database of page number sensing strip sensing coordination in advance. As such, the microprocessor 30 can compare the page number sensing strip sensing coordination message $S_1$ against the entries in the database to determine whether a matching entry is already in the page number sensing strip sensing coordination database. If so, the corresponding page number output instruction $P_1$ is outputted, as shown in FIG. 3b.

In addition, the page number output instruction $P_1$ and a page number message $A_1$ corresponding to the page number output instruction $P_1$ are already entered in the built-in audio database of the player 40. As such, the player 40 can compare the received output instruction $P_1$ against the entries in the audio database to determine whether a matching entry is already in the audio database. If so, the corresponding page number message $A_1$ can be outputted or not.

If the page number message $A_1$ is not outputted, the page number message $A_1$ can be either "silence" or other suitable audio.

Figure 4A:
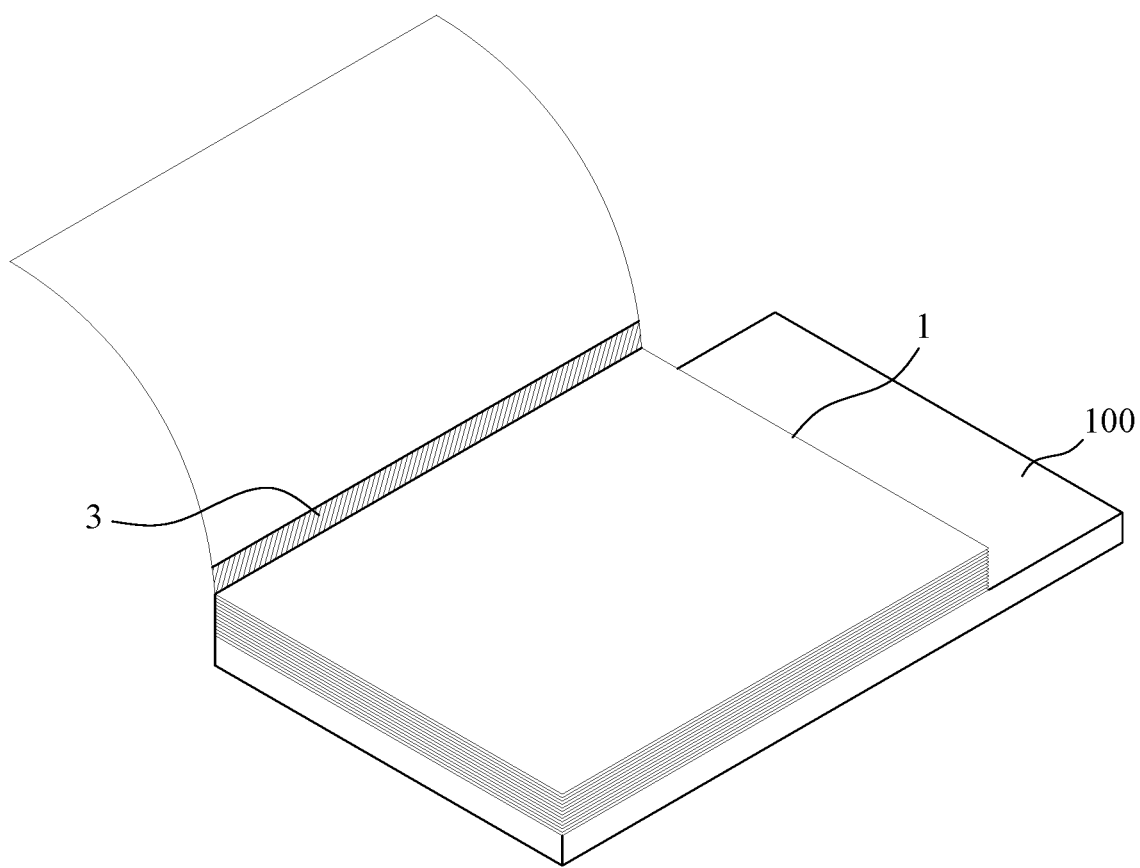
FIG. 4a shows a schematic view of the first page of a physical smart electronic audio book with enhanced sensitivity and reliability in detecting page number in accordance with an embodiment.
Figure 4B:
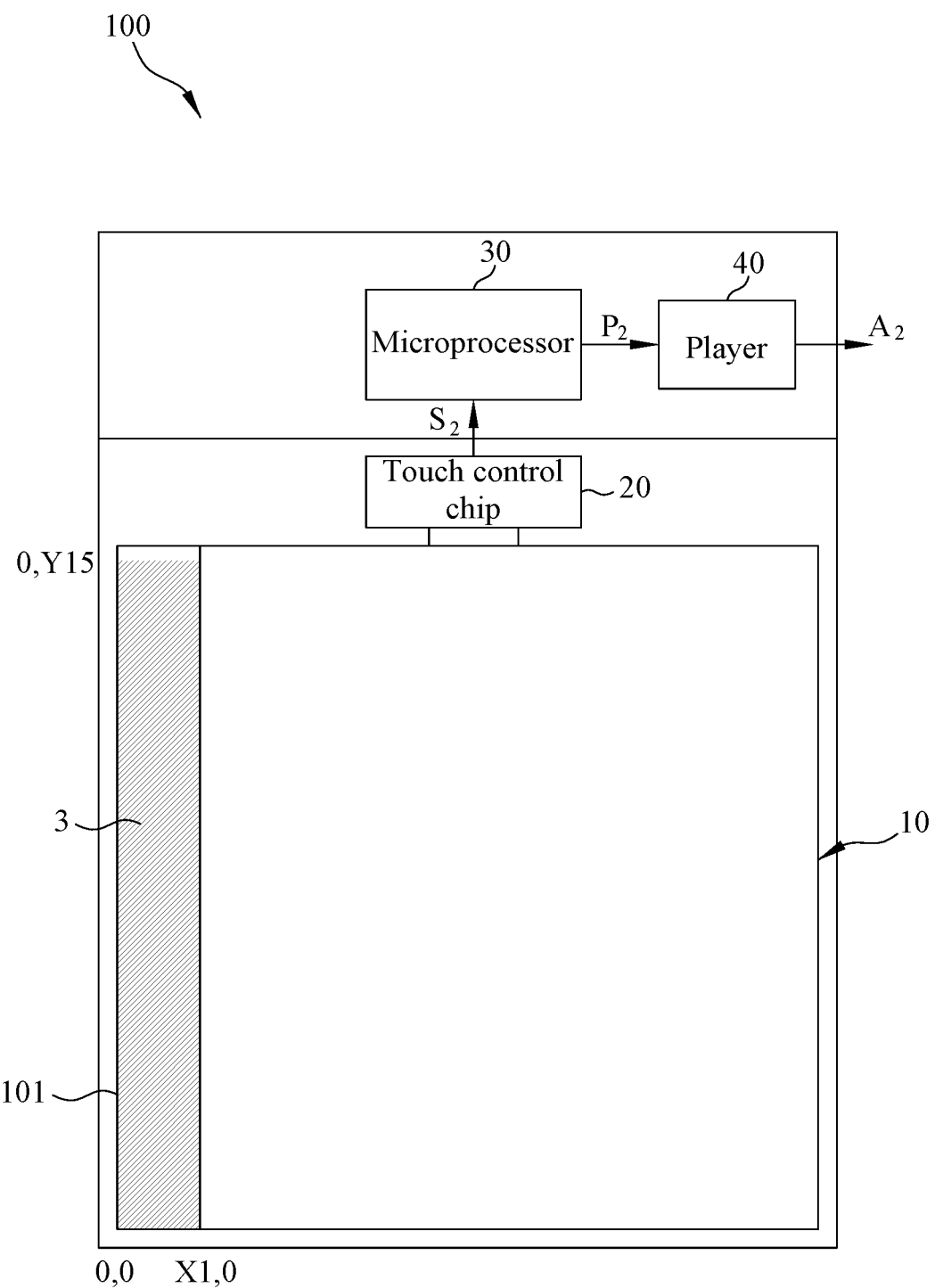

Refer to FIG. 4a and FIG. 4b. FIG. 4a shows a schematic view of the first page of a physical smart electronic audio book with enhanced sensitivity and reliability in detecting page number in accordance with an embodiment; and FIG. 4b shows a schematic view of a circuit block diagram corresponding to the embodiment of FIG. 4a. Therefore, if a user wishes to have the player 40 play the audio "first page" when the physical audio book 1 is turned to the first page, the aforementioned operation can be used with related settings set accordingly.

When the physical audio book 1 is turned to the first page, if the area with changing sensed capacitance of the page number sensing area 101 falls within the (0-X1, 0-Y15) area, the user only needs to enter in advance a data entry of the page number sensing strip sensing coordination message $S_2$ and a page number output instruction $P_2$ corresponding to the page number sensing strip sensing coordination message (0-X1, 0-Y15) into the database of page number sensing strip sensing coordination. When the microprocessor 30 receives the page number sensing strip sensing coordination message $S_2$ being (0-X1, 0-Y15), the corresponding page number output instruction $P_2$ being (0-X1, 0-Y15) is generated and outputted, and the player 40 plays the page number message $A_2$ corresponding to the page number output instruction $P_2$. The page number message $A_2$ can be "first page" or other suitable audio.

By following the aforementioned operation, the player 40 will play a page number message or audio corresponding to a specific page when the physical audio book 1 is turned to the specific page.

Figure 5:
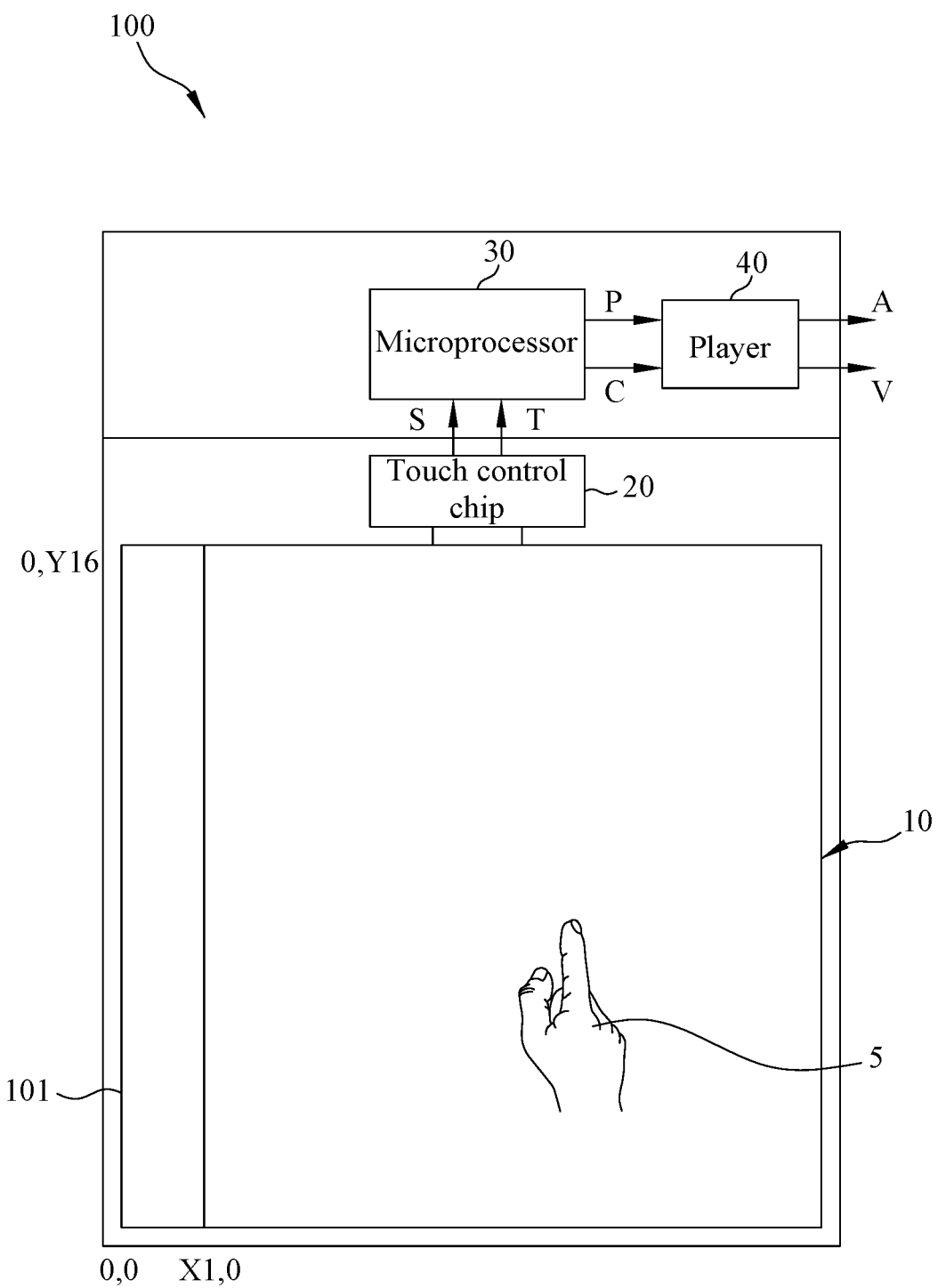
FIG. 5 shows a schematic view of a smart electronic audio book with enhanced sensitivity and reliability in detecting page number as well as detecting a finger in accordance with an embodiment.

Refer to FIG. 5. FIG. 5 shows a schematic view of a smart electronic audio book with enhanced sensitivity and reliability in detecting page number as well as detecting a finger in accordance with an embodiment. As shown in FIG. 5, the capacitive sensor 10 can detect the position of the page number sensing strip 3 as well as further detects the touch position of a touch medium 5, wherein the touch medium 5 can be a finger, touch pen or other suitable touch medium 5.

If at least a touch medium 5 enters the detection range of capacitive sensor 10, the sensed capacitive of an area of the capacitive sensor 10 corresponding to the at least a touch medium 5 also changes. As aforementioned, through the real time detection function of the area with changing sensed capacitance and computation of the touch control chip 20, the area with changing sensed capacitance of the capacitance 10 (corresponding to the at least a touch medium 5) is converted into a touch medium coordination message T for transmitting.

The microprocessor 30 further includes a built-in touch medium coordination database. The microprocessor 30 identifies whether the touch medium coordination message T transmitted from the touch control chip 20 matches a data entry in the built-in database of the touch medium coordination so as to determine whether to transmit an audio output instruction C corresponding to the touch medium coordination message T. The player 40 receives the audio output instruction C from the microprocessor 30, and plays an audio message V corresponding to the audio output message T, wherein the audio message T can be audio sound effect or other types of audio messages.

The user must set in advance the effective sensing area of the capacitive sensor 10, wherein the coordination area or sensing area size of the effective sensing area must be set according to the text and graphical contents in each page of the physical audio book 1. In other words, the effective sensing area depends on the actual contents of each page of the physical audio book 1.

Figure 6:
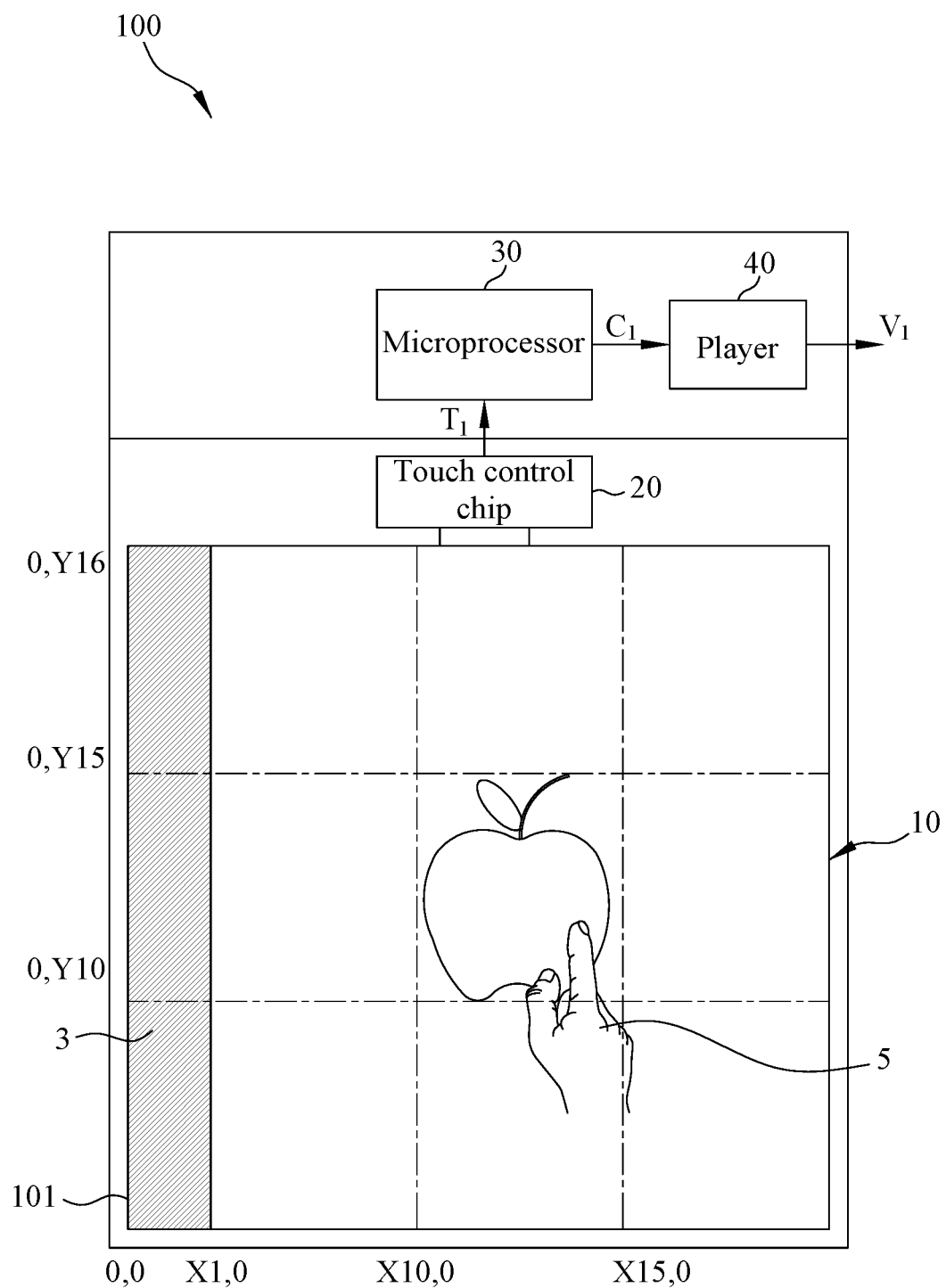
FIG. 6 shows a schematic view of detecting the contents of a page in accordance with an embodiment.

Refer to FIG. 6. FIG. 6 shows a schematic view of detecting the contents of a page in accordance with an embodiment. As shown in FIG. 6, when the physical audio book 1 is turned to the first page P1, the first page P1 includes a picture of an apple. If the apple picture corresponds to the coordination area (X10-X15, Y10-Y15) of the capacitive sensor 10, the effective sensing area of the first page P1 of the capacitive sensor 10 is set as the coordination area (X10-X15, Y10-Y15), wherein the data entry of the coordination area (X10-X15, Y10-Y15) must be entered in the touch medium coordination database.

Therefore, when at least a touch medium 5 enters the detection range of capacitive sensor 10, the sensed capacitive of an area of the capacitive sensor 10 corresponding to the at least a touch medium 5 also changes. The touch control chip 20 continuously converts the area with changing sensed capacitance of the capacitance 10 into a touch medium coordination message $T_1$ and continuously transmits the message to the microprocessor 30 for processing. Hence, when the at least a touch medium 5 moves to the apple picture on the first page P1 of the physical audio book 1, the touch medium coordination message $T_1$ received by the microprocessor 30 matches the data entry built-in in the touch medium coordination database so that an audio output instruction $C_1$ is transmitted to the player 40. According to the audio output instruction $C_1$, the player 40 plays an audio message $V_1$ corresponding to the audio output message $C_1$, wherein the audio message $V_1$ can be "apple", other suitable audio message or sound effects.

Figure 7:
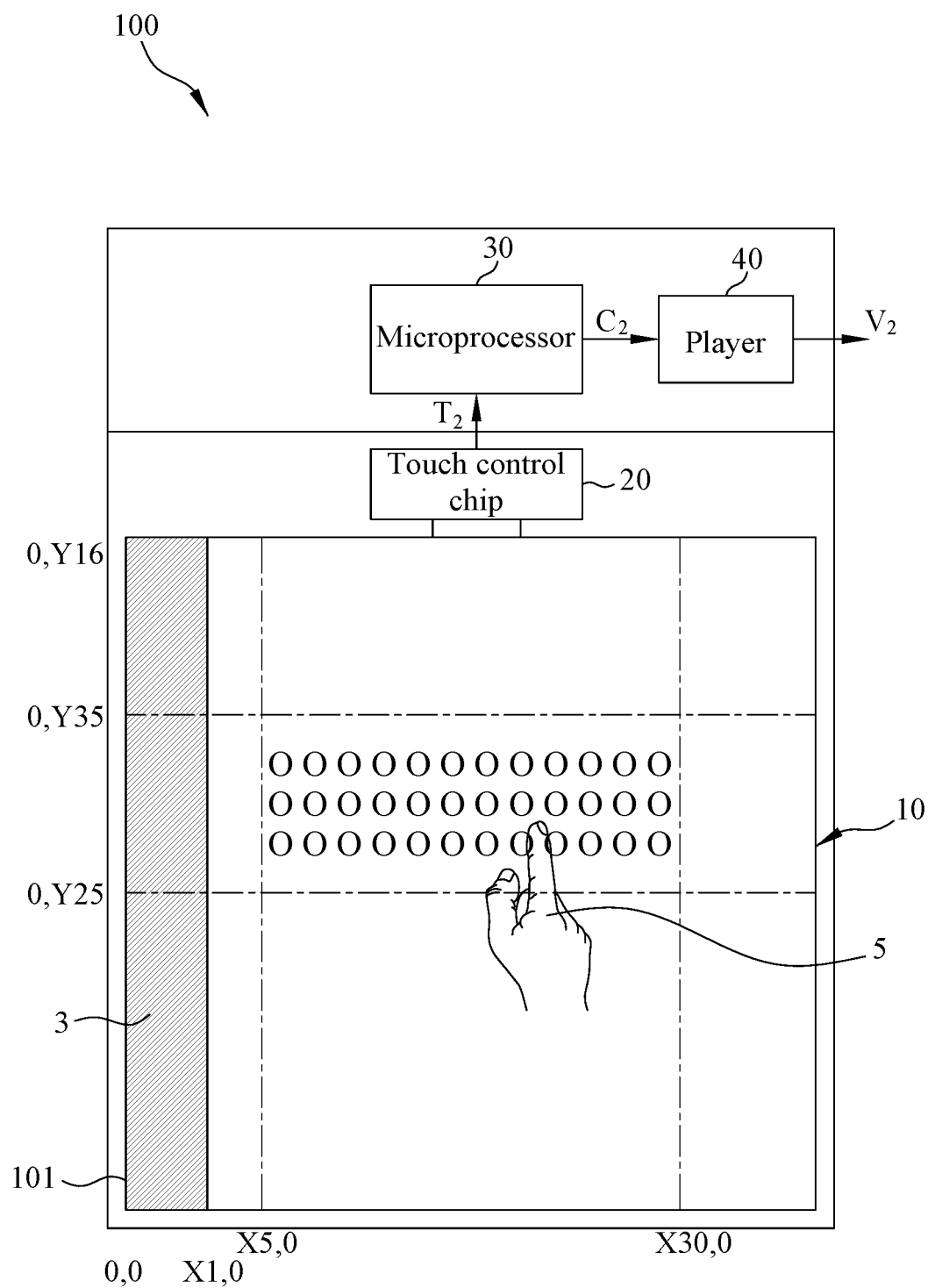
FIG. 7 shows a schematic view of detecting the contents of another page in accordance with an embodiment.

Refer to FIG. 7. FIG. 7 shows a schematic view of detecting the contents of another page in accordance with an embodiment. As shown in FIG. 7, the physical audio book 1 is turned to the third page P3, wherein the third page P3 includes a text passage, located at the coordination area (X05-X30, Y25-Y35) of the capacitive sensor 10. The effective sensing area of the capacitive sensor 10 on the third page P3 is set as coordination area (X05-X30, Y25-Y35). Therefore, a data entry for the coordination area (X05-X30, Y25-Y35) must be entered into the touch medium coordination database in advance.

Therefore, when at least a touch medium 5 enters the detection range of capacitive sensor 10, the sensed capacitive of an area of the capacitive sensor 10 corresponding to the at least a touch medium 5 also changes. The touch control chip 20 continuously converts the area with changing sensed capacitance of the capacitance 10 into a touch medium coordination message $T_2$ and continuously transmits the message to the microprocessor 30 for processing. Hence, when the at least touch medium 5 moves to the text passage on the third page P3 of the physical audio book 1, the touch medium coordination message $T_2$ received by the microprocessor 30 matches the data entry built-in in the touch medium coordination database so that an audio output instruction $C_2$ is transmitted to the player 40. According to the audio output instruction $C_2$, the player 40 plays an audio message $V_2$ corresponding to the audio output message $C_2$, wherein the audio message $V_2$ can be an audio for description of the text passage, other suitable audio message or sound effects.

The aforementioned capacitive sensor 10 uses the page number sensing strip 3 with the largest coverage area to detect the current page number of the physical audio book 1. However, it is only for illustrative purpose, instead of restrictive. Other embodiments can use the page number sensing strips 3 of different sizes, or of the same size but at different positions. As long as the page number sensing strip coordination database is set in advance with the data entries corresponding to the detection area of each page number sensing strip 3 of the capacitive sensor 10, the microprocessor can determine the current page number of the physical audio book 1 and notify the player 40 to play the suitable current page number. The sensing of the capacitive sensor 10 is not limited to the physical contact sensing, but includes the non-physical contact sensing (air touch sensing).

In summary, the present invention can detect and play the page number and contents of a page 11 of the physical audio book 1, such as, graphs or text. Therefore, the present invention is applicable to developing learning book, story book, drawing book, game book, graphical book, and so on, for children development. When the children turn the pages, the present invention will play the current page number; and when the children touch the contents of a page, the related audio of the contents will be played for the children to learn.

Figure 8A:
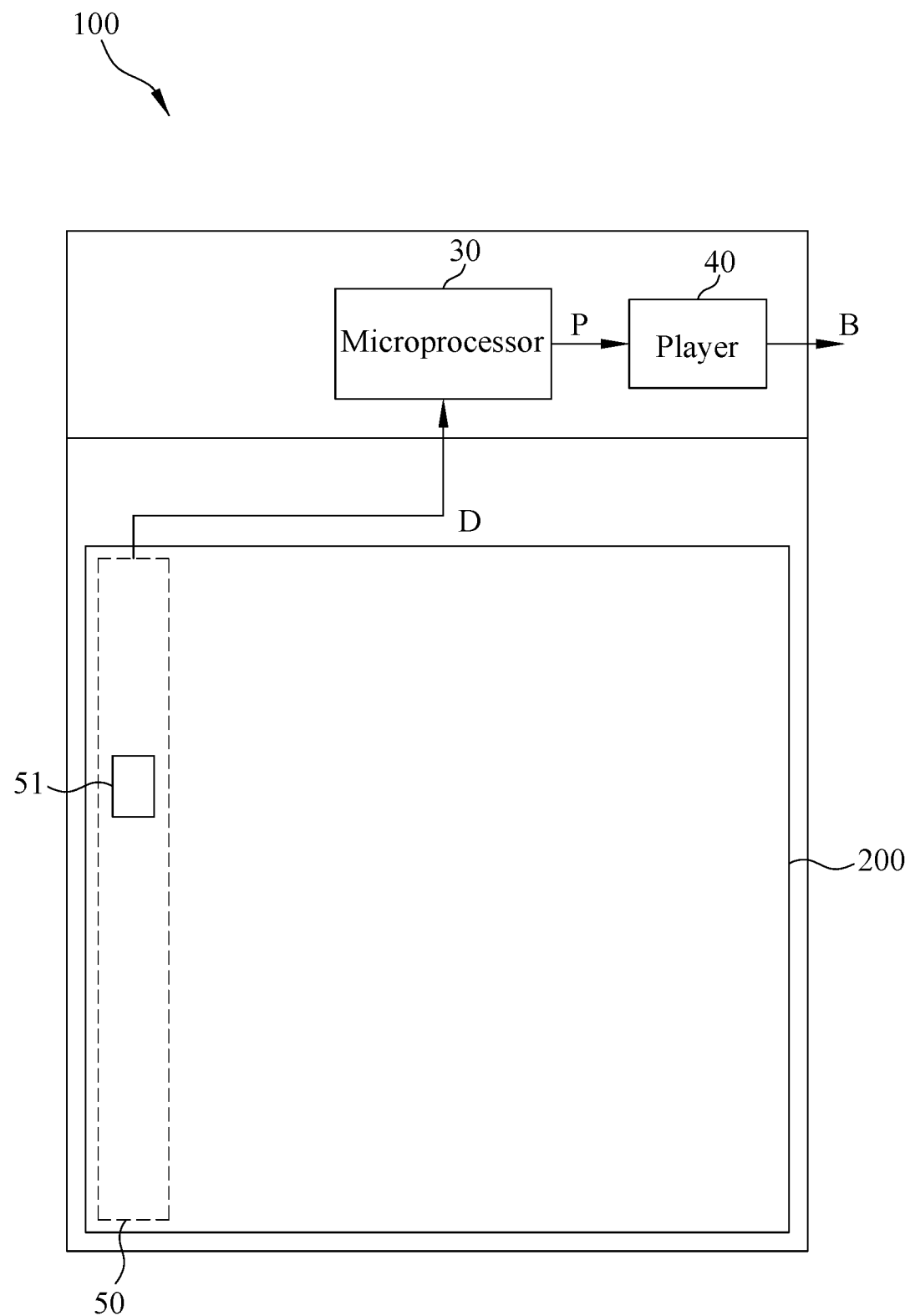
FIG. 8a shows a schematic view of a circuit block diagram in accordance with a first preferred embodiment.
Figure 8B:
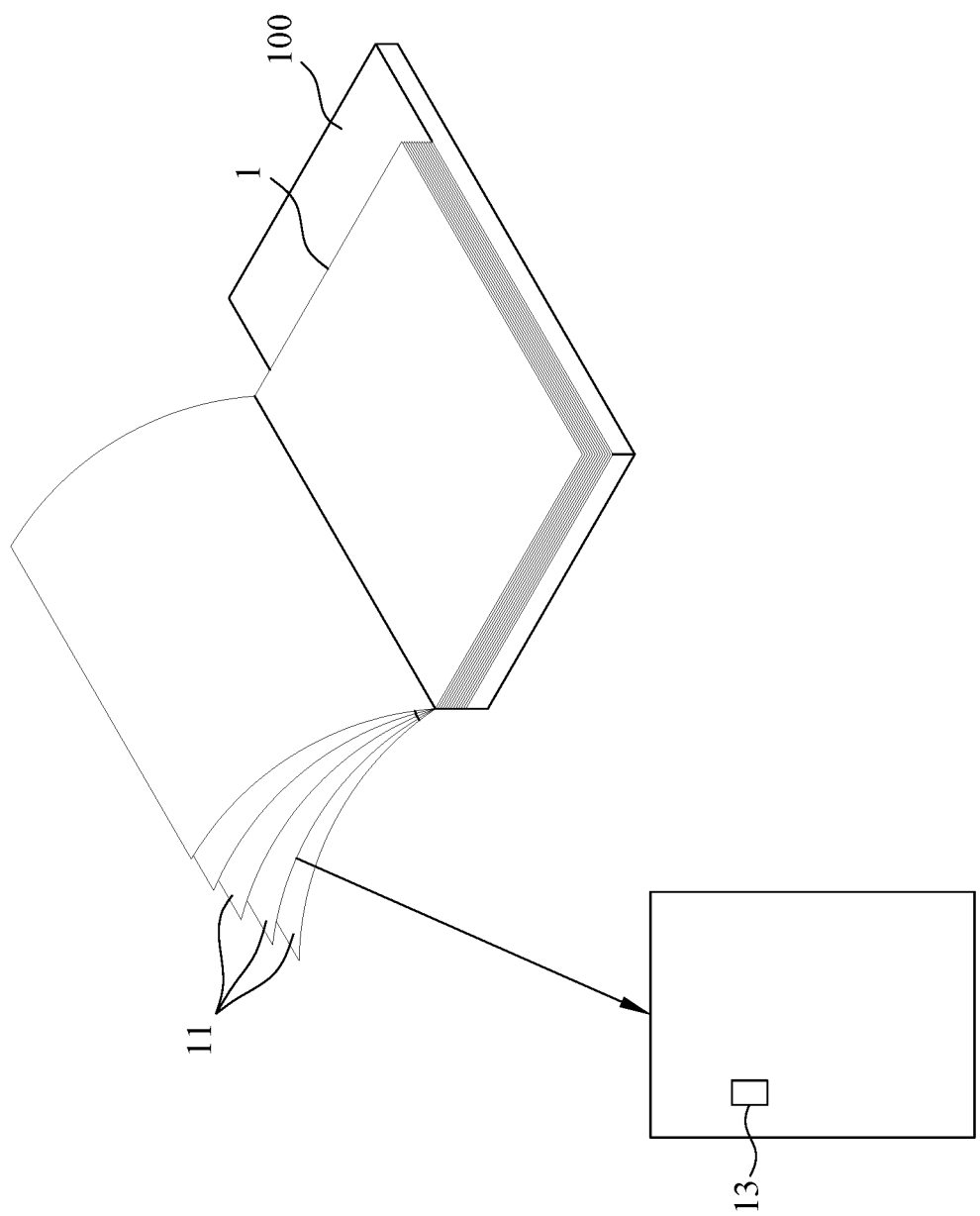
FIG. 8b shows a schematic view of the disposition relation of the physical book and the page number detection unit of the first preferred embodiment.

Refer to FIG. 8*a* and FIG. 8*b*. FIG. 8*a* shows a schematic view of a circuit block diagram in accordance with a first preferred embodiment; and FIG. 8*b* shows a schematic view of the disposition relation of the physical book and the page number detection unit of the first preferred embodiment. As shown in FIG. 8*a* and FIG. 8*b*, the first preferred embodiment of the present invention is for detecting a current page number of a physical audio book 1, including a page number detection unit 50, a microprocessor 30 and a player 40.

The page number detection unit 50 is disposed in the physical audio book 1 and includes a magnetic field detection element 51, which has an effective magnetic field detection range. The physical audio book 1 includes a plurality of pages 11, with each page 11 disposed with a magnet 13. When the page 11 is not turned, the magnet 13 is located within the effective magnetic field detection range of the magnetic field detection element 51. The magnetic field detection element 51 generates and outputs a page number detection signal D according to whether the magnet 13 is located within the effective magnetic field detection range of the magnetic field detection element 13.

The microprocessor 30 is electrically connected to the page number detection unit 50 to receive the page number detection message D, and determines a page number output instruction P corresponding to the page number detection message D according to a conduction state of the received page number detection message and outputs the page number output instruction P.

The player 40 receives the page number output instruction P and plays a page number message B corresponding to the page number output instruction P. The aforementioned page number detection unit 50 is disposed on a circuit board 200; alternatively, the page number detection unit 50 is integrated with the capacitive sensor 10, such as, the circuit board 200 including both the capacitive sensor 10 and the page number detection unit 50. Of course, the capacitive sensor 10 and the page number detection unit 50 can be disposed separately, depending on the application.

Figure 9A:
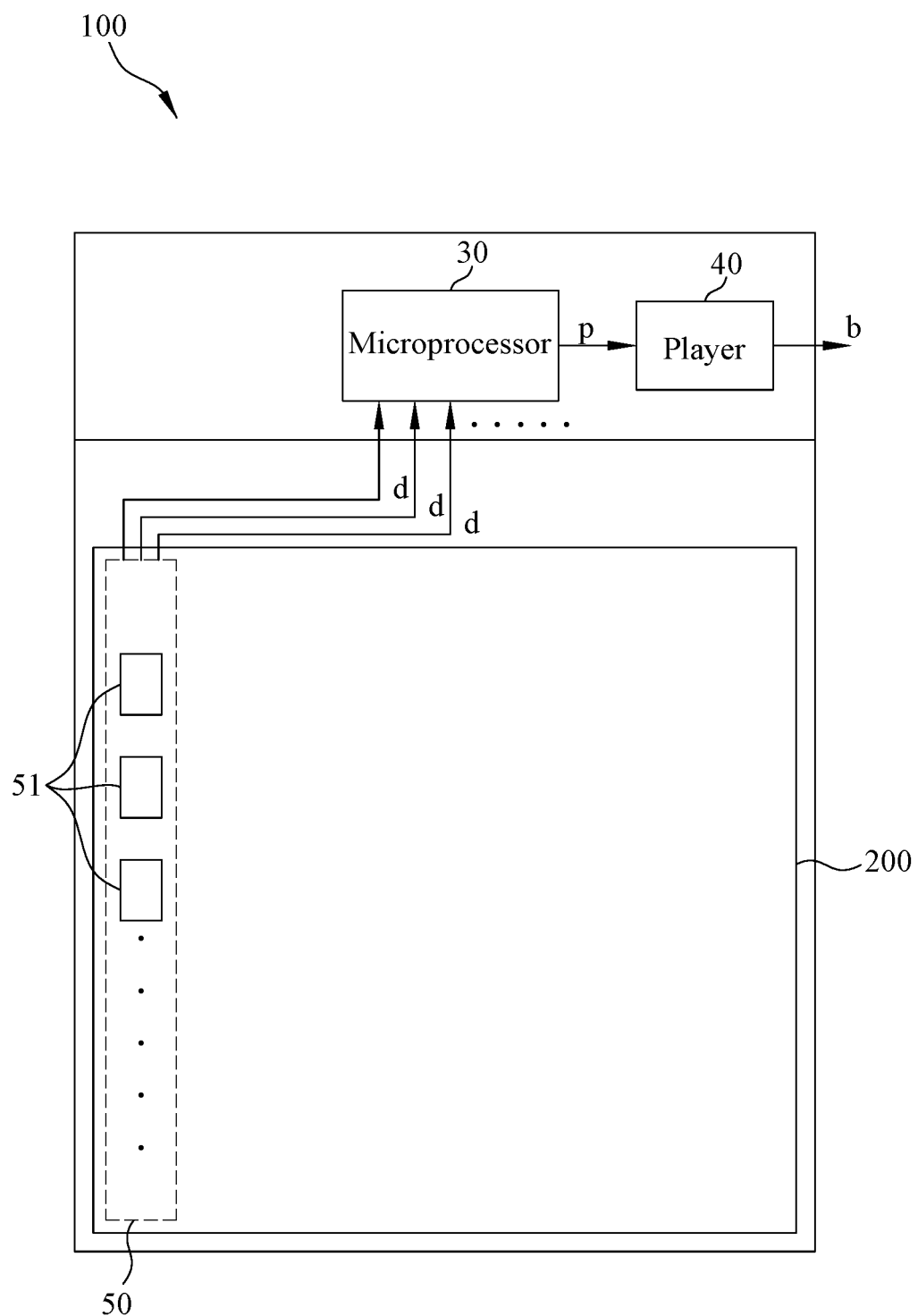
FIG. 9a shows a schematic view of a circuit block diagram in accordance with a second preferred embodiment.
Figure 9B:
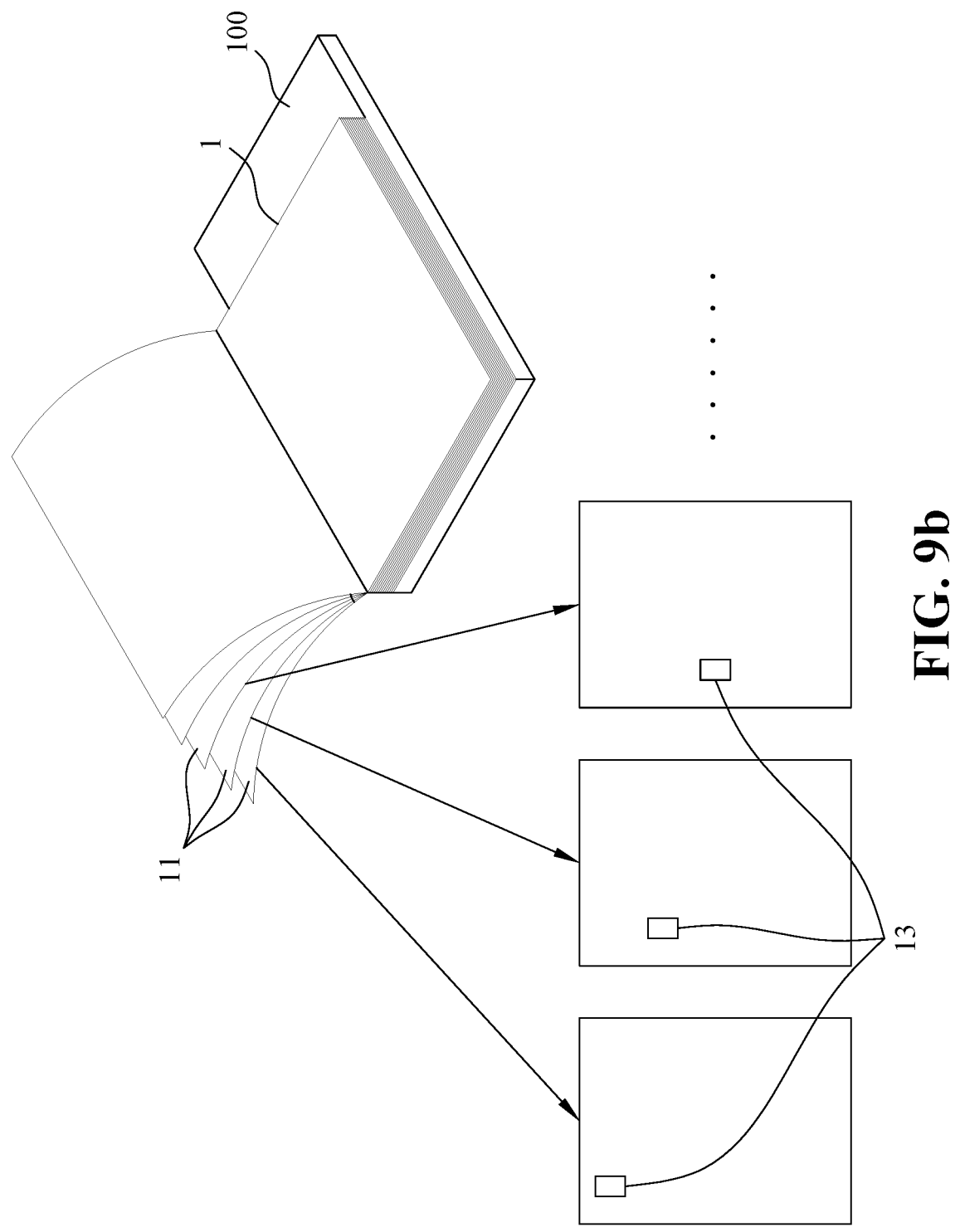
FIG. 9b shows a schematic view of the disposition relation of the physical book and the page number detection unit of the second preferred embodiment.

Refer to FIG. 9*a* and FIG. 9*b*. FIG. 9*a* shows a schematic view of a circuit block diagram in accordance with a second preferred embodiment; and FIG. 9*b* shows a schematic view of the disposition relation of the physical book and the page number detection unit of the second preferred embodiment. As shown in FIG. 9*a* and FIG. 9*b*, the physical audio book 1 further includes a plurality of magnets 13. The page number detection unit 50 further includes a plurality of magnetic field detection elements 51. When the plurality of pages 11 is not turned, the plurality of magnets 13 is respectively located within the effective magnetic field detection ranges of the plurality of magnetic field detection elements 51. The plurality of magnetic field detection elements 51 generates and outputs respectively a page number detection signal d according to whether the plurality of magnets 13 is located respectively within the effective magnetic field detections range of the plurality of magnetic field detection elements 13. According to the number and the conduction state of the page number detection messages d, the microprocessor 30 determines a page number output instruction p corresponding to the page number detection message d according to the number and the conduction state of the received page number detection messages and outputs the page number output instruction p. The player 40 receives the page number output instruction P and plays a page number message b corresponding to the page number output instruction p, wherein the magnetic field detection element 51 is a Hall effect sensor element or an electro-mechanic element able to generate a switch on/off signal according to the magnetic flux change.

Figure 10A:
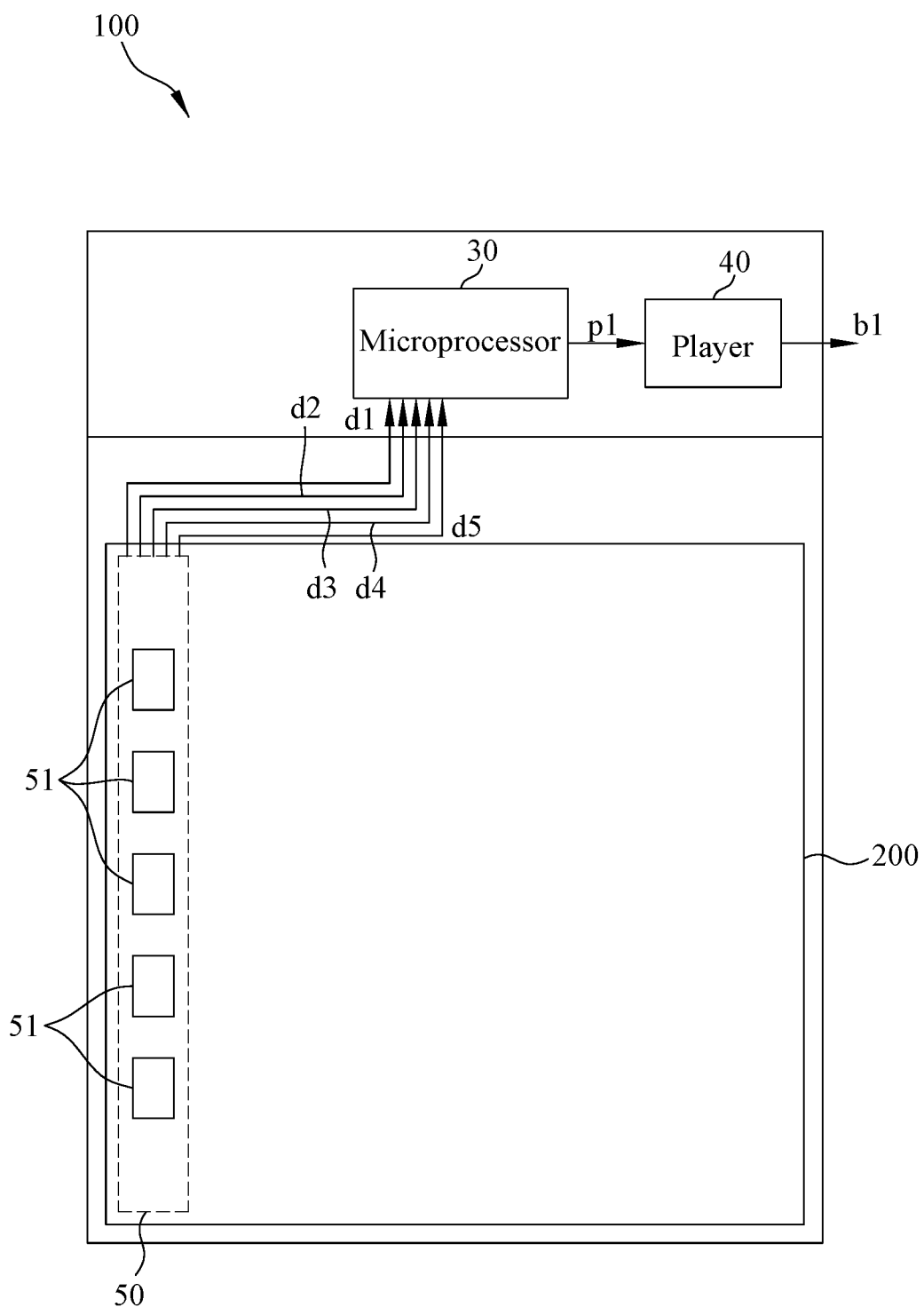
FIG. 10a shows a schematic view of the disposition of the plurality of magnets in the plurality of pages in the second preferred embodiment.
Figure 10B:
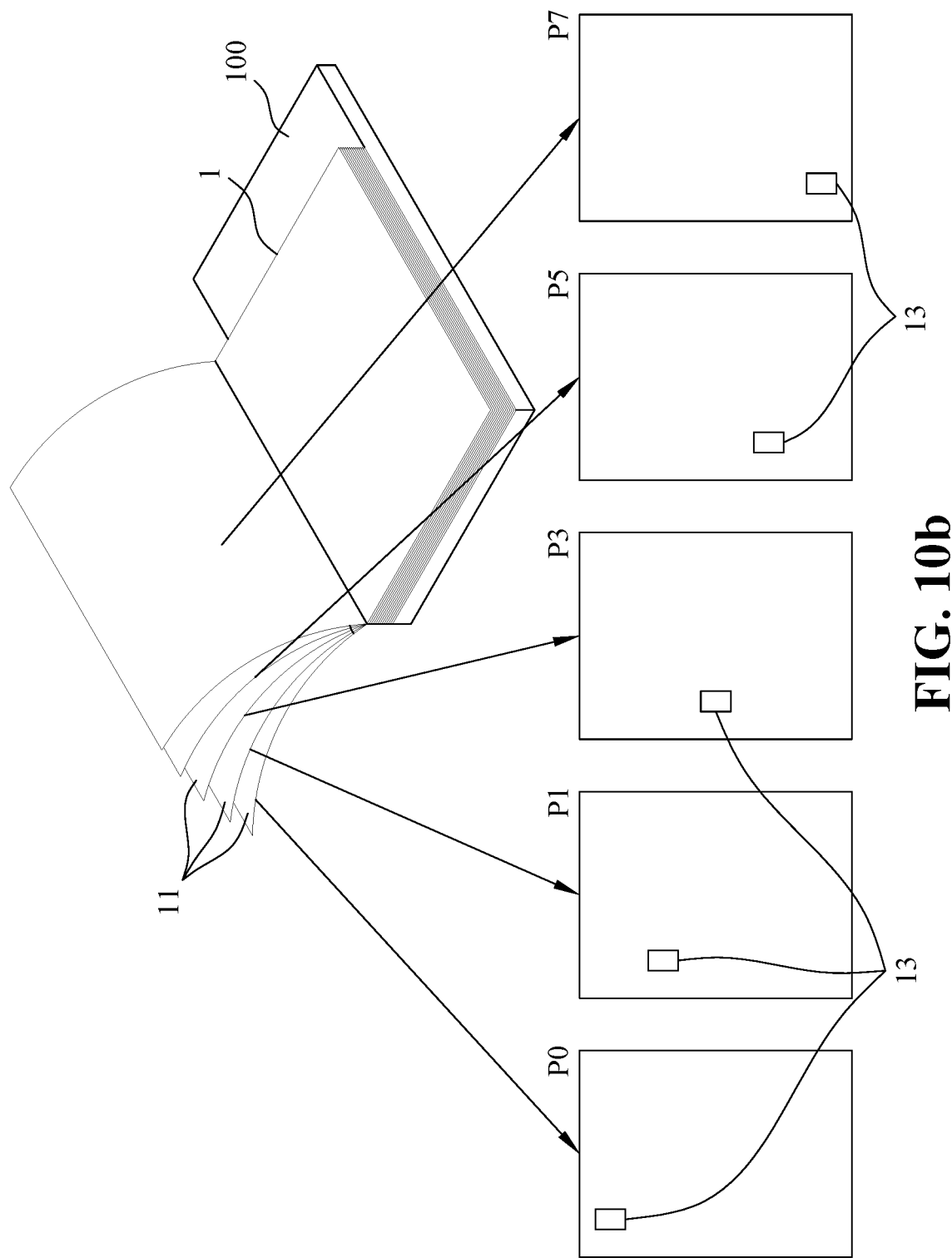

Refer to FIG. 10*a* and FIG. 10*b*. FIG. 10*a* shows a schematic view of the disposition of the plurality of magnets in the plurality of pages in the second preferred embodiment; and FIG. 10*b* shows a schematic view of the circuit block diagram of detecting the cover of the physical book in accordance with FIG. 10*a*. As shown in FIG. 10*a* and FIG. 10*b*, the page number detection unit 50 is disposed with five magnetic field detection elements 51. The physical audio book is disposed with at least a magnet 13 respectively from the cover page to the seventh page P0-P7. The magnets 13 disposed in the cover page to the seventh page P0-P7 must correspond respectively to the five magnetic field detection elements 51.

When the physical audio book 1 is closed, the five magnetic field detection elements 51 can detect the magnets 13 disposed in the cover page to the seventh page P0-P7 to generate a total of five page number detection messages d1-d5 of the conduction state to the microprocessor 30. The microprocessor 30 determines and generates the page number output instruction p1 corresponding to the five page number detection messages d1-d5 of the conduction state so that the player 40 plays the page number message b1 corresponding to the page number output instruction p1, such as, an audio message saying "this is the cover page". Of course, the player 40 can also be instructed not to play any audio, depending on the actual application.

Figure 10C:
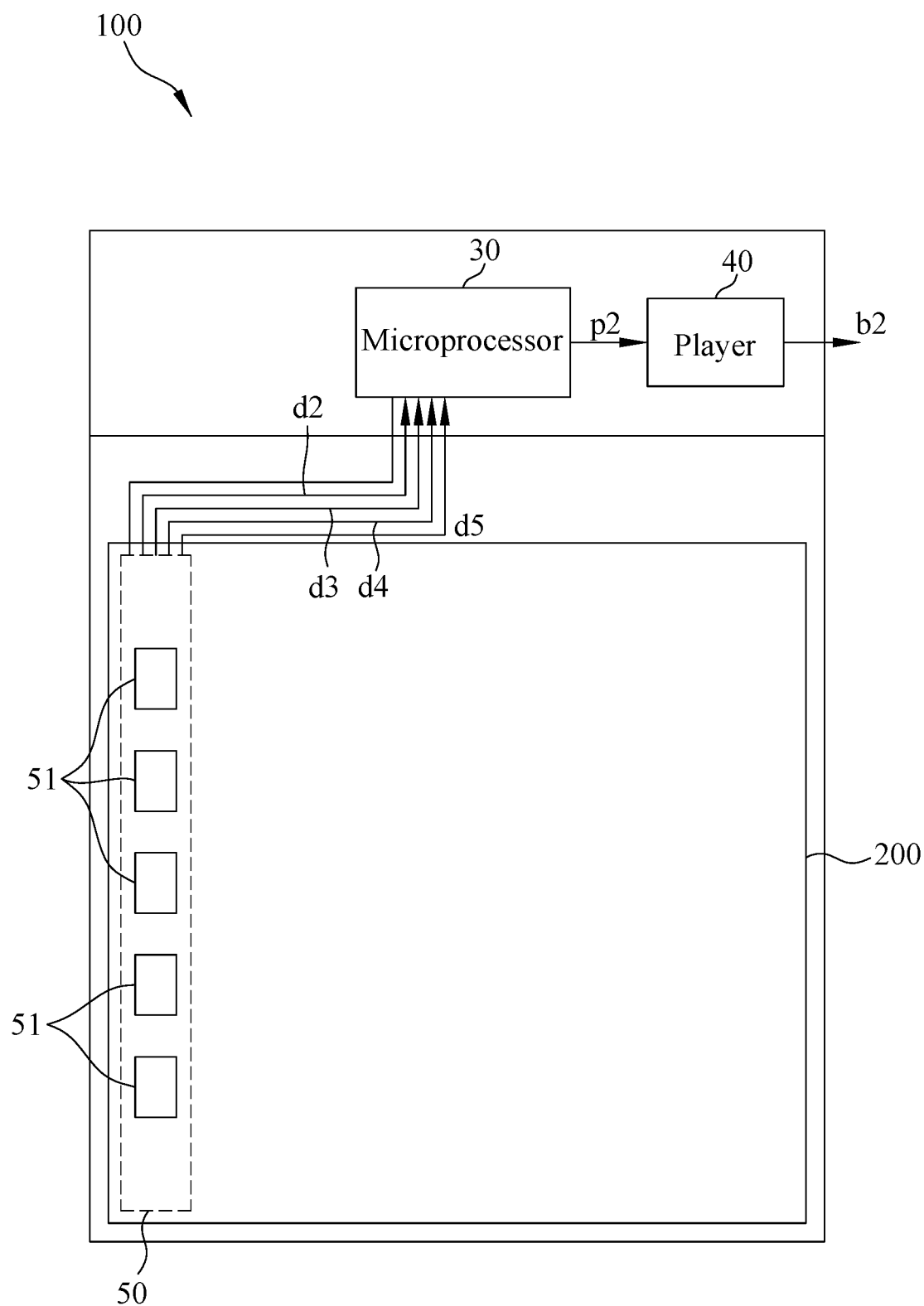

Refer to FIG. 10*c*. FIG. 10*c* shows a schematic view of the circuit block diagram of detecting the first page of the physical book in accordance with FIG. 10*a*. When the cover page P0 of the physical audio book 1 is turned, only four magnetic field detection elements 51 will detect the magnets 13 of the first page to the seventh page P1-P7, to generate four page number detection messages d2-d5 (the line with arrowhead indicating signal transmission) of the conduction state (one is in a cut-off state) transmitted to the microprocessor 30. The microprocessor 30 determines and generates the page number output instruction p2 corresponding to the four page number detection messages d2-d5 of the conduction state so that the player 40 plays the page number message b2 corresponding to the page number output instruction p2.

The aforementioned page number detection message is not limited to the microprocessor detecting the conduction state, but also the cut-off state. To improve the determination efficiency, the conduction state or the cut-off state can also be determined together as long as the microprocessor defines in advance the relation between the number and conduction/ cut-off state of the page number detection message and the page number output instruction.

The aforementioned plurality of pages in the physical audio book is not limited to all pages in the book. It can be only one or some of the pages of the book. Therefore, a physical audio book with one, more or all pages of the book able to play the audio of the current page number is also within the scope of the present invention.

The number, the disposition number and disposition position of the magnets in the aforementioned exemplar can be varied. The exemplar is only for illustrative purpose, instead of restrictive.

The feature of the present invention is to dispose the magnets in a page or a plurality of pages, and dispose the page number detection unit able to detect the magnetic flux change in the physical audio book. When the page is opened or closed, the page number detection unit can detect in real time of the magnetic flux change to generate one or more page number detection messages for the microprocessor to process, and then the player can play preset page number message.

Because the flux of a magnet changes dramatically when the magnet gets suddenly close to or away from the magnetic field detection element, the magnetic field detection element, such as, a hall effect sensor switch, can immediately switch to a conductive state or a cut-off state according to the flux change. Therefore, the smart electronic audio book can detect the page number message of the current page in a more timely and effective manner to improve the sensitivity and reliability of the page number detection.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A smart electronic audio book with page number detection, comprising at least:
    a physical audio book having a plurality of pages, including a first page and a last page, and a plurality of page number sensing strips, each page being disposed with a page number sensing strip that covers an area in a page number sensing area, wherein when advancing sequentially from the first page to the last page of the plurality of pages, the area covered by each respective page number sensing strip decreases successively, each page having a data entry including a page number sensing strip sensing coordination message stored in a page number sensing strip coordination database;
    a capacitive sensor disposed in the physical audio book, the capacitive sensor having a sensed capacitance change at a position in the page number sensing area when the physical audio book is turned to one of the plurality of pages;
    a touch control chip, electrically connected to the capacitive sensor to detect a position of the sensed capacitance change of the capacitive sensor, converting the position of the sensed capacitance change of the capacitive sensor into a page number sensing strip coordination message, and transmitting the page number sensing strip coordination message;
    a microprocessor, having the page number sensing strip coordination database, the microprocessor identifying whether the page number sensing strip coordination message transmitted from the touch control chip matches a data entry in the page number sensing strip coordination database so as to determine whether to transmit a page number output instruction corresponding to the page number sensing strip coordination message;
    a player, having a built-in audio database, the player receiving the page number output instruction and playing a page number message corresponding to the page number output instruction; and
    a power supply unit, electrically connected to the plurality of page number sensing strips;
    wherein when advancing sequentially from the first page to the last page of the plurality of pages, the page number sensing strip of each page occurring on the left-hand-side fully covers the page number sensing strip of a corresponding page occurring on the right-hand-side when the plurality of pages are closed.

2. The smart electronic audio book with page number detection as claimed in claim 1, wherein the capacitive sensor is a flexible indium tin oxide (ITO) film sensor, or a flexible projective capacitive touch sensor.

3. The smart electronic audio book with page number detection as claimed in claim 1, wherein the physical audio book is of a book form or a calendar form.

4. A smart electronic audio book with page number detection, comprising at least:
    a physical audio book having a plurality of pages, including a first page and a last page, and a plurality of page number sensing strips, each page being disposed with a page number sensing strip that covers an area in a page number sensing area, wherein when advancing sequentially from the first page to the last page of the plurality of pages, the area covered by each respective page number sensing strip decreases successively, each page having a data entry including a page number sensing strip sensing coordination message stored in a page number sensing strip coordination database;
    a capacitive sensor disposed in the physical audio book, the capacitive sensor having a sensed capacitance change at a position in the page number sensing area when the physical audio book is turned to one of the plurality of pages;
    at least one touch medium sensing area corresponding to a touch medium coordination in one of the plurality of pages, the capacitor sensor having a sensed capacitance change at the at least one touch medium sensing area when a touch medium enters the at least one touch medium sensing area, and the at least one touch medium sensing area having a data entry including a touch medium coordination message stored in a touch medium coordination database;
    a touch control chip, electrically connected to the capacitive sensor to detect a position of the sensed capacitance change of the capacitive sensor, converting the position of the sensed capacitance change of the capacitive sensor into a page number sensing strip coordination message and/or a touch medium coordination message, and transmitting the page number sensing strip coordination message and/or the touch medium coordination message;
    a microprocessor, having the page number sensing strip coordination database and the touch medium coordination database, the microprocessor identifying whether the page number sensing strip coordination message transmitted from the touch control chip matches a data entry in the page number sensing strip coordination database so as to determine whether to transmit a page number output instruction corresponding to the page number sensing strip coordination message, and the microprocessor identifying whether the touch medium coordination message transmitted from the touch control chip matches a data entry in touch medium coordination database so as to determine whether to transmit an audio output instruction corresponding to the touch medium coordination message;

a player, having a built-in audio database, the player receiving the page number output instruction and the audio output instruction, and playing a page number message corresponding to the page number output instruction and an audio message corresponding to the audio output instruction; and a power supply unit, electrically connected to the plurality of page number sensing strips;

wherein when advancing sequentially from the first page to the last page of the plurality of pages, the page number sensing strip of each page occurring on the left-hand-side fully covers the page number sensing strip of a corresponding page occurring on the right-hand-side when the plurality of pages are closed.

5. The smart electronic audio book with page number detection as claimed in claim 4, wherein the capacitive sensor is a flexible indium tin oxide (ITO) film sensor, or a flexible projective capacitive touch sensor.

\* \* \* \* \*